Figure 1:
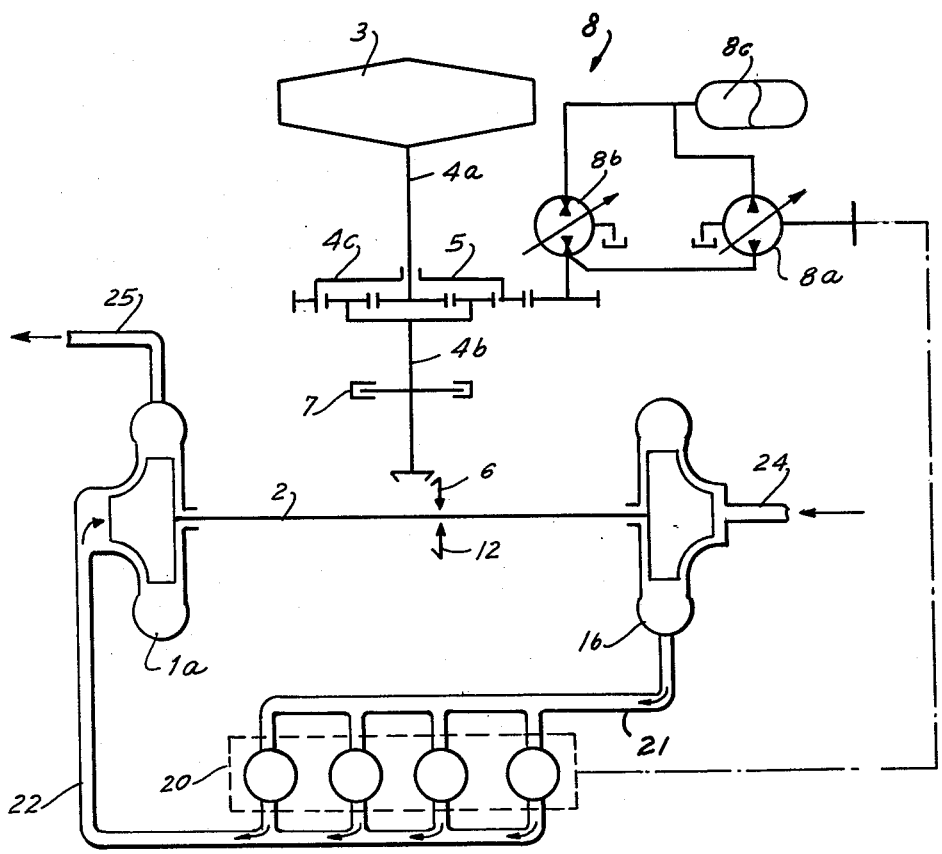

United States Patent [19]

Regar

[11] 4,312,183
[45] Jan. 26, 1982

[54] EXHAUST GAS TURBOCHARGER FOR DIESEL ENGINES

[75] Inventor: Karl N. Regar, Munich, Fed. Rep. of Germany

[73] Assignee: Man Maschinenfabrik Augsburg-Nurnberg AG, Munich, Fed. Rep. of Germany

[21] Appl. No.: 75,915

[22] Filed: Sep. 17, 1979

[30] Foreign Application Priority Data

Sep. 16, 1978 [DE] Fed. Rep. of Germany ....... 2840375

[51] Int. Cl.³ ............................................. F02B 37/10
[52] U.S. Cl. ..................................................... 60/608
[58] Field of Search ........................... 60/607, 608, 605

[56] References Cited

U.S. PATENT DOCUMENTS 3,667,214  6/1972  Addie ..................................... 60/608
4,083,188  4/1978  Kumm ............................... 60/608 X

FOREIGN PATENT DOCUMENTS 567836  9/1977  U.S.S.R. ................................. 60/607

Primary Examiner—Michael Koczo, Jr.
Attorney, Agent, or Firm—Alan H. Levine

[57] ABSTRACT

An exhaust gas turbocharger for a diesel engine, the turbocharger including a compressor, an exhaust gas turbine, and a shaft joining the compressor and turbine. A flywheel is mounted on another shaft, and a device, such as a freewheel, alternatively couples and uncouples the flywheel shaft and turbocharger shaft. The flywheel shaft is in two sections, and a summation mechanism, such as a planetary gear arrangement, is between the two shaft sections. The summation mechanism is controlled by a hydrostatic device and/or an electronic device. A brake is provided for selectively preventing rotation of the flywheel shaft section between the summation mechanism and the turbocharger shaft.

4 Claims, 2 Drawing Figures

EXHAUST GAS TURBOCHARGER FOR DIESEL ENGINES

The present invention relates to an exhaust gas turbocharger for diesel engines. It is known that diesel engines which are provided with exhaust gas turbochargers are sluggish and thus exhibit poor acceleration. This disadvantage is particularly evident when a diesel engine so equipped is used to drive a motor vehicle.

The techniques which have become known for overcoming this drawback have not gained general acceptance since they either still have technical defects or are too expensive.

The object of the present invention is to provide an improvement in an exhaust gas turbocharger for diesel engines which makes rapid acceleration of the engine possible in a relatively simple manner.

The invention will now be explained on basis of illustrative embodiments shown in the drawings.

Figure 2:
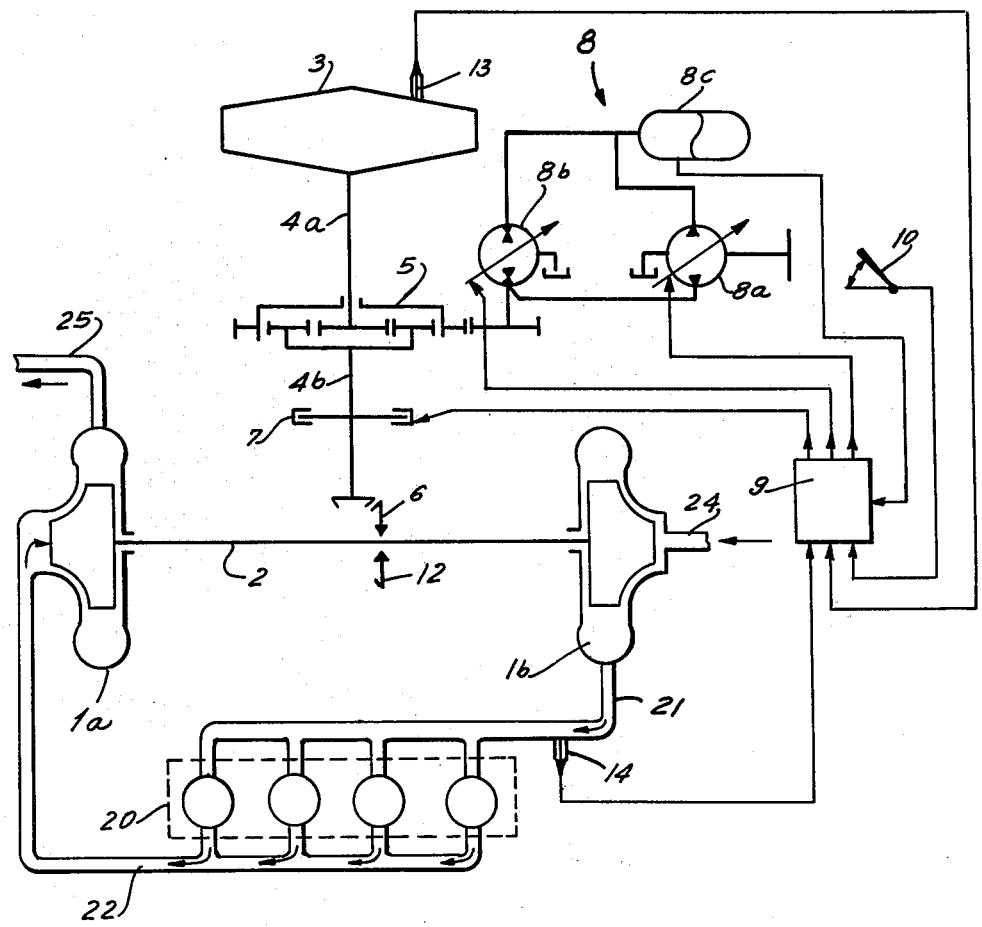

FIG. 1 is a schematic illustration showing a diesel engine provided with an exhaust gas turbocharger according to the present invention; and FIG. 2 is a similar illustration showing the arrangement of FIG. 1 furnished with an electrical control system.

Referring to FIG. 1, a diesel engine 20 has its air inlet manifold connected by a suction line 21 to the outlet of a compressor 1b, air entering the compressor at inlet 24. The exhaust gas manifold of engine 20 is connected by conduit 22 to the inlet of an exhaust gas turbine 1a, the exhaust gas leaving the turbine through outlet pipe 25. Exhaust gas turbine 1a is connected to compressor 1b by a shaft 2, the turbine and compressor combination constituting a turbocharger.

According to the invention, a flywheel 3 can be coupled to shaft 2 by means of a freewheel, or overriding clutch, 6. The flywheel shaft has two sections 4a and 4b. Between the two shaft sections 4a and 4b of the flywheel 3 there is arranged a summation gearing 5 which is controlled by means of a hydraulic device 8. The hydraulic device consists essentially of a pump 8a driven by the diesel engine, a hydromotor 8b, and a high pressure accumulator 8c interposed between them.

A brake 7 is arranged in the flywheel shaft section 4b.

At a given acceleration of the engine, the flywheel 3, which is in rapid rotation from the previous normal operation, is connected by means of the freewheel 6 to shaft 2. At this time, the brake 7 is released and the specific required speed of rotation and the torque are adjusted at the output of the summation mechanism 5 by means of the hydraulic control device 8.

The turbocharger 1a, 1b is accelerated by this feeding of energy of momentum of the flywheel, as a result of which the booster pressure in the engine, and thus also its torque, rapidly increase. After the desired speed of rotation of the engine has been reached, the flywheel is again brought to its maximum speed of rotation. This is done by applying the brake 7, and feeding the required energy from the diesel engine to the flywheel via the pump 8a, the hydromotor 8b, and the summation mechanism 5. The connection of the shaft 4b to the shaft 2 of the turbocharger is opened by freewheel 6.

More specifically, the freewheel 6 operates as follows:

when the speed of rotation of the bevel gear 12 (within the hub of which the freewheel 6 is located) is less than the speed of rotation of the shaft 2, the freewheel is open;

if the speed of rotation of the bevel gear 12 is increased by means of the flywheel 3, the summation gearing 5, and the control mechanism 8, the freewheel 6 remains open until the speed of rotation of the bevel gear 12 is equal to the speed of rotation of the shaft 2;

if the speed of rotation of the bevel gear 12 tends to become greater than the speed of rotation of the shaft 2, the freewheel 6 automatically closes and the bevel gear drives the shaft 2, which makes possible a transmission of power from the flywheel 3 to the shaft 2;

as soon as the exhaust gas turbine 1a produces sufficient power for a further increase in the speed of rotation of the shaft 2, the freewheel connection between the bevel gear 12 and shaft 2 automatically opens so that the shaft 4b can be braked to a standstill by means of the brake 7 without the function of the turbocharger being affected, i.e., bevel gear 12 is stationary but the shaft 2 and thus the turbocharger operate.

The summation mechanism 5 is a planetary gear arrangement including a sun gear shaft 4a, a planet (satellite) carrier shaft 4b, and a hollow gear 4c. The dependence of the speed of the shafts 4a and 4b and gear 4c with respect to each other is described by the equation:

$$n_{4a} + i_O \cdot n_{4c} = (i_O + 1) n_{4b}$$

in which $i_o$ is the stationary gear ratio of the planetary gearing.

When the speed of rotation of shaft 4a, which is the speed of the flywheel, and the speed of rotation of shaft 4b, which corresponds to the speed of turbocharger shaft 2, are given, then the speed of rotation of the gear 4c is determined by the above equation, and the direction of rotation of gear 4c may be positive or negative.

For the torques M the following two equations apply:

$$M_{4a} + M_{4c} = M_{4b}$$

and $$M_{4a} = M_{4b}/(i_O + 1) = (M_{4c}/i_O)$$

As long as the torque of the gear 4c is zero, transmission of energy from the flywheel 3 to the turbocharger shaft 2 is not possible since $M_{4a}$ and $M_{4b}$ are also zero. This fact is utilized for a controlled transmission of power from the flywheel 3 to the shaft 2, in that by means of the hydromotor 8b a moment is applied to the shaft 4b of the summation gearing 5. If the speed of rotation of the gear 4c is negative, the hydromotor 8b operates as a pump and pumps oil out of the oil reservoir (not shown) into the high-pressure accumulator 8c. The required pumping moment, the value of which also determines the value of the output moment at the shaft 4b, is applied to the gear 4c of the summation gearing 5, which results in the gradual braking of this gear until it is stationary. As soon as this point has been reached, the hydromotor 8b changes its direction of rotation, due to the effect of the oil stored in the high pressure accumulator 8c, and continues to operate as a motor until the high pressure accumulator 8c is empty. During this time, the speed of rotation of the flywheel 3 continuously decreases and the speed of rotation of the shaft 2 of the turbocharger continuously increases. In this way, the acceleration of the turbocharger is aided by additional feeding of energy from the flywheel 3.

In order to control a new acceleration process, the flywheel 3 is additionally charged by holding the shaft 4b fast, by means of the brake 7, and employing the pump 8a to drive the motor 8b in a negative direction of rotation until the speed of rotation of the flywheel 3 has reached its maximum value. The hydrostatic devices 8a and 8b are then set to zero conveyance and the brake 7 released, which results in an interruption of the additional charging process.

A new accelerating process is initiated by setting the hydromachine 8b to pump operation, as described above.

FIG. 2 shows the system controlled by an electronic controller 9 and making use of the gas pedal 10 of the vehicle. Controller 9 continuously measures the position of the gas pedal 10, the pressure of the boosting air in the suction line 21 of the engine 20, using a pressure sensor 14, the pressure in the high pressure accumulator 8c, and the speed of rotation of the flywheel 3.

After the engine 20 is started, regardless of the position of the gas pedal 10, the controller 9 orders the charging of the flywheel 3, the pumps 8a and 8b being suitably operated to achieve this, and the brake 7 is closed. When the speed-of-rotation detector 13 of the flywheel 3 indicates that the maximum speed of rotation has been reached, the charging process is interrupted, the controller 9 places the pumps 8a and 8b on zero-conveyance, and the brake 7 is opened.

If the motor 20 remains at idle for a long time and the speed of rotation of the flywheel 3 drops below a predetermined speed of rotation as a result of frictional losses in the system, a recharging process is automatically initiated so that at all times there is stored in the flywheel sufficient energy for one or more successive accelerating processes of the engine (for instance, upon changing of gears).

If the gas pedal 10 is actuated rapidly, i.e., changed from idle to full speed, the fuel injection pump introduces a large quantity of fuel into the cylinder. Usually, since the charging pressure is low and reaches the pressure necessary for the injected amount of fuel only after several seconds, incomplete combustion with strong formation of soot takes place. The torque of the engine 20 remains far below the rated value during this period of time, which ordinarily results in poor acceleration behavior of the motor vehicle. The reason for this is the physically caused inertia of the turbocharger.

In accordance with the present invention, these disadvantages are overcome because the charging pressure is increased within a substantially shorter period of time (for instance, 2 seconds instead of 20 seconds). The electronic controller 9 places the hydromotor 8b in pump operation and thereby makes possible the transmission of the kinetic energy of the flywheel 3 to the shaft 2 of the turbocharger.

As soon as the pressure detector 14 senses that the charging pressure has reached the rated value, the controller 9 places the hydromotor 8b at zero conveyance and thereby interrupts the transmission of energy from the flywheel 3 to the turbocharger shaft 2. If the charging pressure drops again, for instance upon shifting of gears, and the driver depresses the gas pedal 10 again all the way, the controller 9 again places the hydromotor 8b in pump operation (or at motor operation if the direction of rotation of the gear 4c is positive) until the charging pressure has again reached its rated value, or until the accumulator 8c is empty, or until the speed of rotation of the flywheel has dropped too low, which initiates a recharging process.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. An exhaust gas turbocharger for a diesel engine, comprising:
    (a) a turbocharger including a compressor, an exhaust gas turbine, and a shaft joining the compressor and turbine,
    (b) a flywheel having a two-section flywheel shaft,
    (c) a freewheel for alternatively coupling and uncoupling the flywheel shaft and turbocharger shaft,
    (d) a summation mechanism between the two sections of the flywheel shaft,
    (e) a hydrostatic device for controlling the output of the summation mechanism, the hydrostatic device including a pump adapted to be driven by the diesel engine, a hydromotor for driving the summation mechanism, and a high pressure accummulator between the pump and hydromotor.

2. An exhaust gas turbocharger as defined in claim 1 wherein said summation mechanism includes a planetary gear arrangement.

3. An exhaust gas turbocharger as defined in claim 1 wherein said hydrostatic device is controlled by an electronic controller.

4. An exhaust gas turbocharger for a diesel engine, comprising:
    (a) a turbocharger including a compressor, an exhaust gas turbine, and a shaft joining the compressor and turbine,
    (b) a flywheel having a two-section flywheel shaft,
    (c) a summation mechanism between the two sections of the flywheel shaft,
    (d) means for alternatively coupling and uncoupling said flywheel shaft and turbocharger shaft, and
    (e) a brake for selectively preventing rotation of the section of the flywheel shaft between the summation mechanism and the turbocharger shaft.

* * * * *